US012772053B2

(12) United States Patent
Thiebaut et al.

(10) Patent No.: US 12,772,053 B2
(45) Date of Patent: Oct. 20, 2026

(54) AUTHENTICATION AND AUTHORIZATION FOR USER EQUIPMENT (UE)-TO-NETWORK RELAYING

(71) Applicant: Nokia Technologies Oy, Espoo (FI)

(72) Inventors: Laurent Thiebaut, Massy (FR); György Wolfner, Budapest (HU); Devaki Chandramouli, Dallas, TX (US); Suresh Nair, Whippany, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 598 days.

(21) Appl. No.: 17/998,668

(22) PCT Filed: May 13, 2020

(86) PCT No.: PCT/US2020/032706
§ 371 (c)(1),
(2) Date: Nov. 13, 2022

(87) PCT Pub. No.: WO2021/230867
PCT Pub. Date: Nov. 18, 2021

(65) Prior Publication Data
US 2023/0362637 A1 Nov. 9, 2023

(51) Int. Cl.
*H04W 12/06* (2021.01)
*H04W 12/72* (2021.01)

(52) U.S. Cl.
CPC ........... *H04W 12/06* (2013.01); *H04W 12/72* (2021.01)

(58) Field of Classification Search
CPC .............................. H04W 12/06; H04W 12/72
See application file for complete search history.

(56) References Cited

U.S. PATENT DOCUMENTS

2013/0163762 A1* 6/2013 Zhang ................. H04W 12/108 380/270
2019/0191356 A1* 6/2019 Norp .................. H04W 12/086
(Continued)

FOREIGN PATENT DOCUMENTS

CN 106465111 A 2/2017

OTHER PUBLICATIONS

Gamboa—System Level Evaluation of UE-to-network relays in D2D-enabled LTE (Year: 2019).*
(Continued)

*Primary Examiner* — Jinsong Hu
*Assistant Examiner* — Justin Barry
(74) *Attorney, Agent, or Firm* — SQUIRE PATTON BOGGS (US) LLP

(57) ABSTRACT

Systems, methods, apparatuses, and computer program products for creation of a PCS connection between the remote user equipment (UE) and the relay UE. The remote UE may provide its identifier (e.g., a subscription concealed identifier (SUCI)) to the relay UE and the relay UE may forward this identifier to the network so that the network can authenticate the remote UE. The network may check the authorization of using the relay UE and/or for relaying the remote UE (e.g., both the remote UE and the relay UE may be checked for a configuration that permits the relaying). For the authentication and authorization, the access and mobility management function (AMF) associated with the relay UE may forward the messages between the remote UE and the authentication server function (AUSF) of the remote UE. In this way, certain embodiments described herein may address certain security issues related to relaying a remote UE.

8 Claims, 10 Drawing Sheets

(56) References Cited

U.S. PATENT DOCUMENTS

| | | | | |
|---|---|---|---|---|
| 2019/0394816 | A1 | 12/2019 | Kim | |
| 2020/0077253 | A1* | 3/2020 | Kim | H04W 76/30 |
| 2020/0213927 | A1* | 7/2020 | Buckley | H04W 36/36 |
| 2021/0282195 | A1* | 9/2021 | Paladugu | H04W 72/20 |
| 2021/0345104 | A1* | 11/2021 | Cheng | H04W 12/0433 |
| 2022/0408396 | A1* | 12/2022 | Youn | H04W 76/34 |
| 2023/0023639 | A1* | 1/2023 | Shi | H04W 8/005 |

OTHER PUBLICATIONS

Communication pursuant to Article 94(3) EPC dated Dec. 4, 2024, in corresponding European Patent Application No. 20731263.8.

Mediatek Inc, "FS_5G_ProSe: Security aspects of L2 relay," 3GPP Draft; S2-2000785, SA WG2 Meeting #136AH, Jan. 13-17, 2020, XP051842839.

"3rd Generation Partnership Project; Technical Specification Group Services and System Aspects; Study on system enhancement for Proximity based Services (ProSe) in the 5G System (5GS) (Release 17)", 3GPP TR 23.752, V0.3.0, Jan. 2020, pp. 1-73.

"3rd Generation Partnership Project; Technical Specification Group Services and System Aspects; Proximity-based services (ProSe); Stage 2 (Release 15)", 3GPP TS 23.303, V15.1.0, Jun. 2018, pp. 1-130.

"3rd Generation Partnership Project; Technical Specification Group Services and System Aspects; Proximity-based Services (ProSe); Security aspects (Release 15)", 3GPP TS 33.303, V15.0.0, Jun. 2018, pp. 1-90.

"3rd Generation Partnership Project; Technical Specification Group Services and System Aspects; Generic Authentication Architecture (GAA); Generic Bootstrapping Architecture (GBA) (Release 16)", 3GPP TS 33.220, V16.0.0, Sep. 2019, pp. 1-93.

"3rd Generation Partnership Project; Technical Specification Group Services and System Aspects; Architecture enhancements for 5G System (5GS) to support Vehicle-to-Everything (V2X) services (Release 16)", 3GPP TS 23.287 V16.2.0, Mar. 2020, pp. 1-53.

"3rd Generation Partnership Project; Technical Specification Group Core Network and Terminals; Numbering, addressing and identification; (Release 16)", 3GPP TS 23.003, V16.2.0, Mar. 2020, pp. 1-140.

"3rd Generation Partnership Project; Technical Specification Group Services and System Aspects; Procedures for the 5G System (5GS); Stage 2 (Release 16)", 3GPP TS 23.502, V16.4.0, Mar. 2020, pp. 1-582.

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

International Search Report and Written Opinion received for corresponding Patent Cooperation Treaty Application No. PCT/US2020/032706, dated Oct. 14, 2020, 10 pages.

"3rd Generation Partnership Project; Technical Specification Group Services and System Aspects; Study on the security aspects of the next generation system (Release 14)", 3GPP TR 33.899, V1.3.0, Aug. 2017, 605 pages.

Communication pursuant to Article 94(3) EPC dated Apr. 26, 2024 corresponding to European Patent Application No. 20731263.8.

Office action received for corresponding Indian Patent Application No. 202247071143, dated Feb. 20, 2023, 5 pages.

Notification of the First Office Action dated Mar. 3, 2025, corresponding to Chinese Patent Application No. 2020801027965, with English translation thereof.

European Communication under Rule 71(3) EPC, corresponding to EP Application No. 20 731 263.8, dated Jun. 30, 2025.

* cited by examiner

AUTHENTICATION AND AUTHORIZATION FOR USER EQUIPMENT (UE)-TO-NETWORK RELAYING

RELATED APPLICATION

This application was originally filed as PCT Application No. PCT/US2020/032706, filed on May 13, 2020, of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for authentication and authorization for user equipment (UE)-to-network relaying.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include receiving, by a relay UE, an identifier for a remote UE. The relay UE may be within radio coverage of a network and may provide access to the network to the remote UE that is out of the radio coverage. The method may include providing, to a relay network entity, a first request for authorization and authentication to relay the remote UE. The first request may include the identifier for the remote UE. The relay network entity may be associated with a serving network of the relay UE. The method may include relaying signaling between the remote UE and the serving network of the relay UE when the signaling is associated with authenticating the remote UE. The method may include receiving a response associated with the first request. The response may include information identifying a result of the first request, or security information to be used in association with relaying the remote UE.

In a variant, the identifier of the remote UE may include a subscription concealed identifier (SUCI). In a variant, the relay network entity may include an access and mobility management function (AMF). In a variant, a non-access stratum (NAS) message may include the first request for authorization and authentication or the response associated with the first request. In a variant, the result of the first request may indicate that the first request has been accepted. In a variant, the method may further include relaying, to the relay network entity, data received via the connection based on the first request being accepted.

According to a second embodiment, a method may include receiving, by a first relay network entity, a first request for authorization for a relay UE to relay a remote UE. The first request may include an identifier for the remote UE. The relay UE may be within radio coverage of a network and may provide access to the network to the remote UE that is out of the radio coverage. The method may include providing, to a second relay network entity, the first request for authorization. The first request may include an identifier for the remote UE and an identifier for the relay UE. The second relay network entity may be associated with a home network of the relay UE. The method may include relaying, between the relay UE and the second relay network entity, a second request for authentication of the remote UE. The method may include receiving a response associated with the first request for authorization or the second request for authentication. The response may include information identifying a result of the first request or the second request, or security information associated with the relay of the remote UE. The method may include providing the response to the relay UE.

In a variant, the identifier of the remote UE may include a SUCI. In a variant, the identifier of the relay UE may include at least one of a subscription permanent identifier (SUPI) or a generic public subscription identifier (GPSI). In a variant, the first relay network entity may include an AMF. In a variant, the second relay network entity may include an authentication server function (AUSF). In a variant, the result of the first request may indicate that the first request has been denied. In a variant, the result of the first request may indicate that the first request has been accepted.

According to a third embodiment, a method may include receiving, by a first relay network entity, a first request for authorization and authentication for a relay UE to relay a remote UE. The first request may include an identifier for the remote UE and an identifier for the relay UE. The method may include ensuring that the remote UE is authenticated and that the remote UE is authorized to be relayed by the relay UE. The method may include providing, to a second relay network entity having issued the first request for authorization and authentication for the relay UE to relay the remote UE, a response based on a configuration indicating whether the relay UE is permitted to relay the remote UE.

In a variant, determining that the remote UE is authenticated and that the remote UE is authorized, may include, when the remote UE and the relay UE have different home networks or when the remote UE cannot be served by the first relay network entity, providing, to a remote network entity, a second request for authorization for the remote UE to be relayed by the relay UE. In a variant, the remote network entity may be associated with a home network associated with the remote UE. In a variant, determining that the remote UE is authenticated and that the remote UE is authorized, may include, when the remote UE and the relay UE have different home networks or when the remote UE cannot be served by the first relay network entity, relaying, between the first relay network entity and the remote network entity, a third request associated with authenticating the remote UE. In a variant, determining that the remote UE is authenticated and that the remote UE is authorized, may include, when the remote UE and the relay UE have different home networks or when the remote UE cannot be served by the first relay network entity, receiving a response associated with the second request or the third request. In a variant, the response may include information identifying a result of the second request or the third request, an identity of the remote UE, or security information associated with the relay of the remote UE.

In a variant, the identifier of the remote UE may include a SUCI. In a variant, the identifier of the relay UE may include at least one of a SUPI or a GPSI. In a variant, the first relay network entity may include an AUSF. In a variant, the second relay network entity may include an AMF. In a variant, the first request may be received from the second network entity. In a variant, the remote network entity may include an AUSF.

In a variant, the result of the first request may indicate that the first request has been denied. In a variant, the result of the first request may indicate that the first request has been accepted. In a variant, the method may include determining whether the configuration indicates that the relay UE is permitted to relay the remote UE based on information from an unified data management (UDM) function or from an authentication, authorization, and accounting (AAA) server.

In a variant, determining that the remote UE is authenticated and that the remote UE is authorized, may include, when the remote UE and the relay UE have a same home network, authenticating the remote UE via a relay serving network entity. In a variant, determining that the remote UE is authenticated and that the remote UE is authorized, may include, when the remote UE and the relay UE have a same home network, determining whether the configuration indicates that the remote UE is permitted to be relayed by the relay UE. In a variant, determining that the remote UE is authenticated and that the remote UE is authorized, may include, when the remote UE and the relay UE have a same home network, exchanging, with the remote UE, signaling to perform authentication and authorization for the remote UE via a serving network of the relay UE and the relay UE. In a variant, an indication used by the serving network of the relay UE and by the relay UE may be associated with relaying the signaling.

According to a fourth embodiment, a method may include receiving a request for authorization and authentication for a remote UE to be relayed by a relay UE. The request may include an identifier for the remote UE and an identifier for the relay UE. The relay UE may be within radio coverage of a network and may provide access to the network to the remote UE that is out of the radio coverage. The method may include authenticating the remote UE via a relay home network entity. The method may include receiving, from another remote network entity, information that identifies whether the remote UE is permitted to be relayed by the relay UE. The method may include providing, to a relay network entity, a response associated with the request for authorization. The response may include information identifying a result of the request, an identity of the remote UE, or security information associated with the relay of the remote UE.

In a variant the identifier of the remote UE may include a SUCI. In a variant, the identifier of the relay UE may include at least one of a SUPI or a GPSI. In a variant, the remote network entity may include an AUSF. In a variant, the relay network entity may include an AUSF.

In a variant, the result of the request may indicate that the request has been denied. In a variant, the result of the request may indicate that the request has been accepted. In a variant, the method may further include determining whether the remote UE is permitted to be relayed by the relay UE.

In a variant, the method may include providing the response based on determining that the remote UE is permitted to be relayed by the relay UE. In a variant, the method may include determining whether the remote UE is permitted to be relayed by the relay UE based on information from an UDM function or an AAA server. In a variant, the method may include authenticating the remote UE. In a variant, the method may include generating the security material based on a result of authenticating the remote UE.

A fifth embodiment may be directed to an apparatus including at least one processor and at least one memory comprising computer program code. The at least one memory and computer program code may be configured, with the at least one processor, to cause the apparatus at least to perform the method according to the first embodiment, the second embodiment, the third embodiment, or the fourth embodiment, or any of the variants discussed above.

A sixth embodiment may be directed to an apparatus that may include circuitry configured to perform the method according to the first embodiment, the second embodiment, the third embodiment, or the fourth embodiment, or any of the variants discussed above.

A seventh embodiment may be directed to an apparatus that may include means for performing the method according to the first embodiment, the second embodiment, the third embodiment, or the fourth embodiment, or any of the variants discussed above.

An eighth embodiment may be directed to a computer readable medium comprising program instructions stored thereon for performing at least the method according to the first embodiment, the second embodiment, the third embodiment, or the fourth embodiment, or any of the variants discussed above.

A ninth embodiment may be directed to a computer program product encoding instructions for performing at least the method according to the first embodiment, the second embodiment, the third embodiment, or the fourth embodiment, or any of the variants discussed above.

BRIEF DESCRIPTION OF THE DRAWINGS

For proper understanding of example embodiments, reference should be made to the accompanying drawings, wherein.

DETAILED DESCRIPTION

Figure 1:
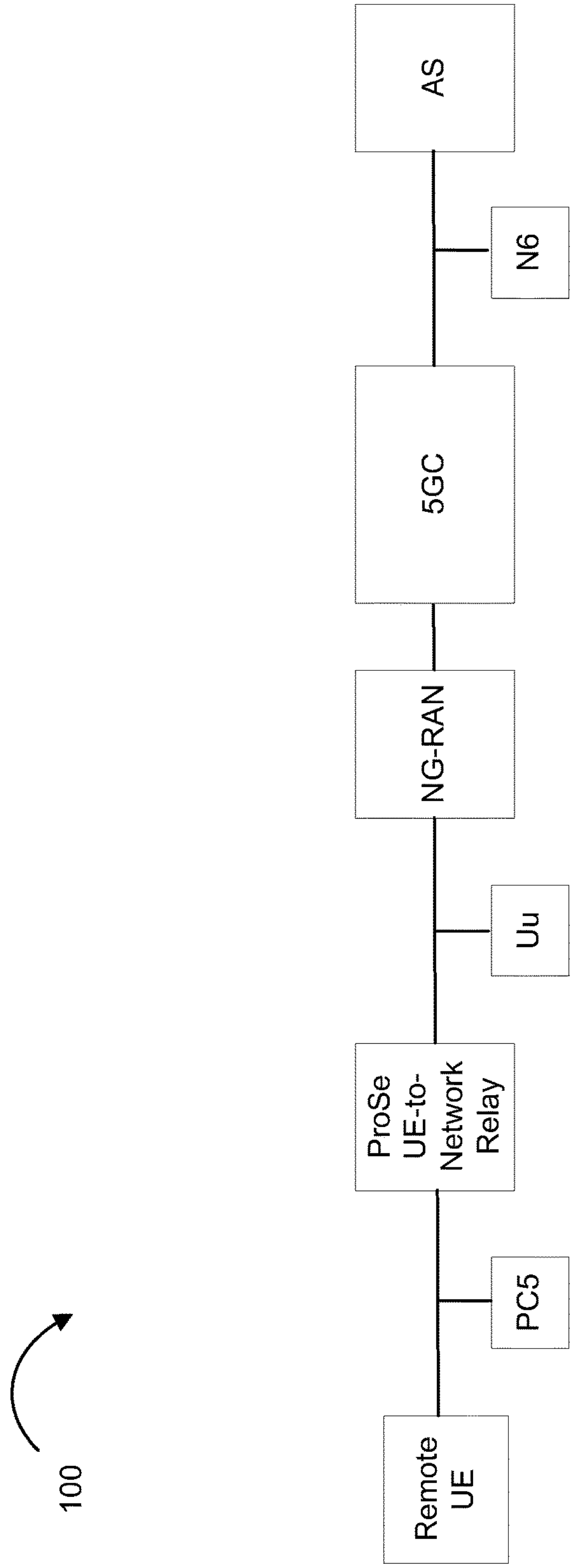
FIG. 1 illustrates an example architecture model using a proximity-based services (ProSe) 5G UE-to-network layer 3 (L3) solution, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for authentication and authorization for UE-to-network relaying is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

ProSe UE-to-network relay may include a relay mechanism where a UE provides functionality to support connectivity to a network for remote UE(s) (e.g., UE(s) that are out of the radio coverage and cannot directly access a 3GPP radio network, and, therefore, may need the service of at least another UE in the radio coverage (referred to as a "UE-to-Network relay" or "Relay UE") in order to reach a 3GPP radio network). A relay UE (a ProSe UE-to-Network relay) may have connectivity to a 5G system (5GS) and may relay control plane (CP) signalling and user plane (UP) traffic of remote UE(s) that cannot get direct connectivity to the 5GS. This feature may be useful for members of public safety forces (e.g., firemen/police). It may also be used for other commercial usage (e.g., wearable devices with limited battery life and/or coverage). There may be various sets of solutions for ProSe UE-to-network relay. One set may include a layer 2 (L2) solution where the 5G radio access network (RAN) and the relay UE may be modified so that the 5G RAN handles the remote UE directly for both CP and UP. In this case, the remote UE may be directly authenticated by the 5GS as if it had a direct radio interface. Another set may include a layer 3 (L3) solution where the 5G RAN may not be aware of the remote UE. In this case, the remote UE may not be directly authenticated by the 5GS as if it had a direct radio interface. The Relay UE may be unaware of whether it relays UP or CP data for the remote UE.

FIG. 1 illustrates an example architecture model using a proximity-based services (ProSe) 5G UE-to-network layer 3 (L3) solution, according to some embodiments. For example, certain embodiments described herein may apply to the architecture 100 illustrated in FIG. 1. Architecture 100 may include a remote UE, a PC5 interface (e.g., a direct radio interface between 2 3GPP UE(s)), a ProSe UE-to-network relay (a relay UE), a Uu interface (e.g., a 3GPP radio interface between a 3GPP UE and a NG RAN), a next generation RAN (NG-RAN), a 5G core (5GC), a N6 interface (e.g., an user plane interface between a 3GPP defined 5G core (5GC) and a data network), and an application server (AS). Certain embodiments described herein may address security of the architecture illustrated in FIG. 1 but can apply to any L3 solution to support UE-to-network relay (including a baseline L3 UE to network relay solution described in certain technical specifications). For example, certain embodiments described herein may address authentication of the remote UE before establishing a PC5 connection between the remote UE and a relay UE, may check whether the remote UE accepts being relayed by the relay UE, may check whether the relay UE accepts relaying the remote UE, may facilitate potential creation of dedicated security keys over PC5, and/or the like.

As described above, FIG. 1 is provided as an example. Other examples are possible, according to some embodiments.

Figure 2:
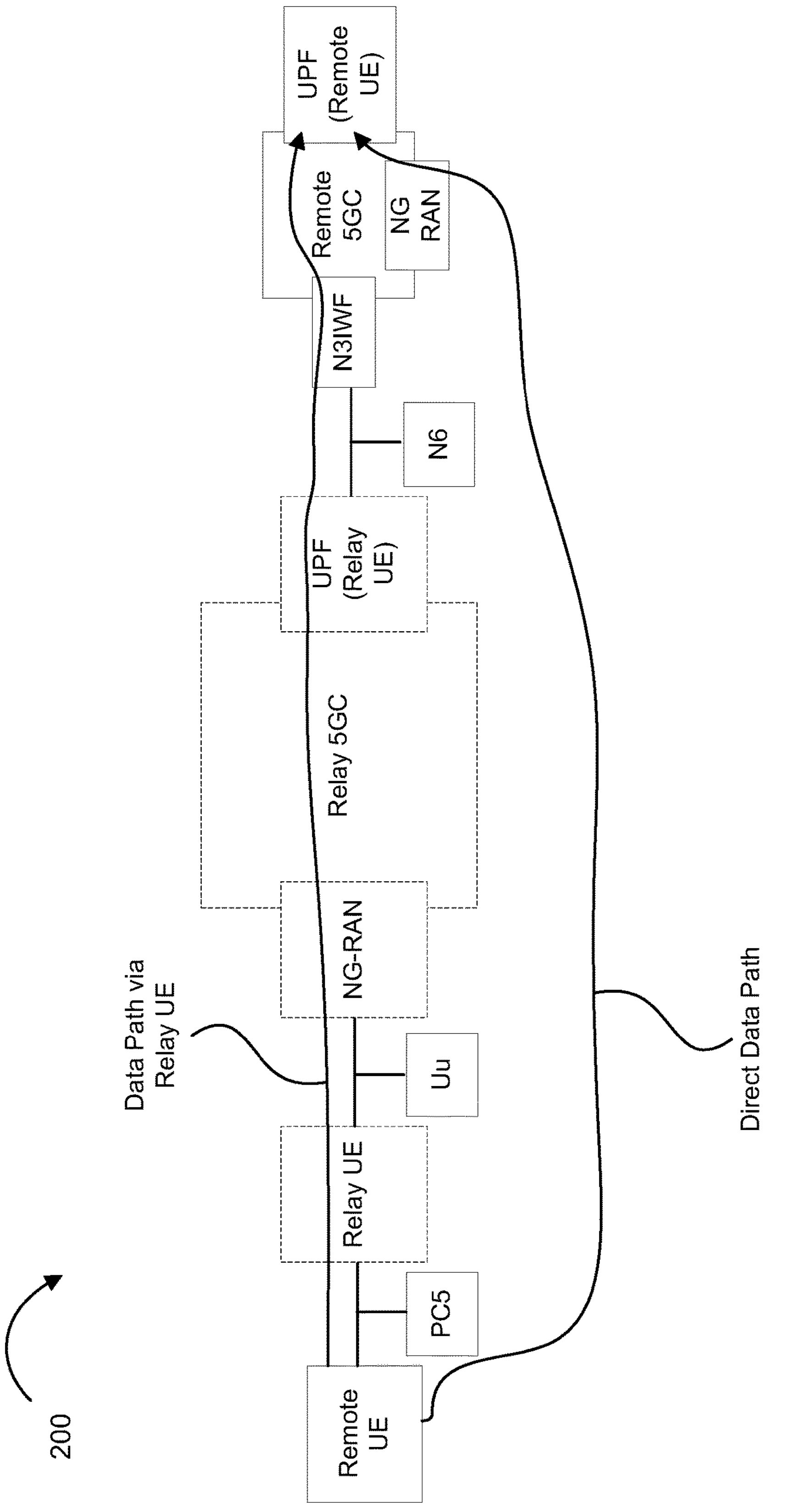
FIG. 2 illustrates an example architecture model using a ProSe 5G UE-to-network L3 relay solution with usage of a non-3GPP interworking function (N3IWF), according to some embodiments.
Figure 3:
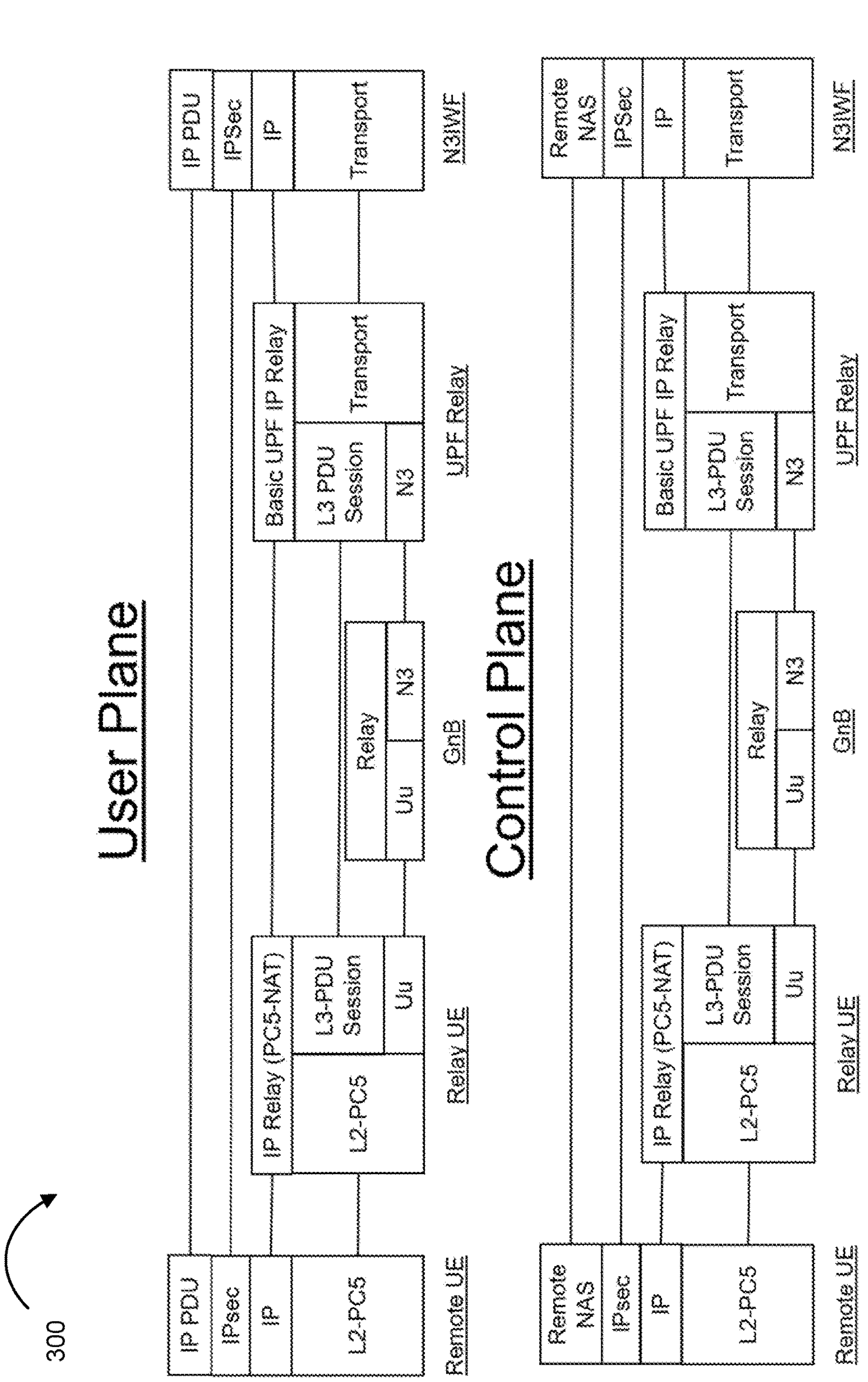
FIG. 3 illustrates example protocol stacks with a ProSe 5G UE-to-network L3 relay solution, according to some embodiments.

FIG. 2 illustrates an example architecture model using a ProSe 5G UE-to-network L3 relay solution with usage of a N3IWF, according to some embodiments. For example, FIG. 2 illustrates an architecture 200 in which certain embodiments described herein may be implemented. As illustrated, architecture 200 may include a remote UE, a PC5 interface, a relay UE, a Uu interface, a NG-RAN, a relay 5GC, a UPF (associated with the relay UE), a N6 interface, a remote 5GC, a N3IWF, a NG-RAN, and a UPF (associated with the remote UE). FIG. 3 illustrates example protocol stacks with a ProSe 5G UE-to-network L3 relay solution, according to some embodiments. For example, FIG. 3 illustrates protocol stacks 300.

With respect to FIGS. 2 and 3, the 5GC serving the relay UE and the 5GC serving the remote UE may correspond to the same 5GC network, however, certain embodiments described herein may also apply to architectures where they are associated with different networks or different slices of the same network. For example, as illustrated in the FIG. 2, the 5GC (serving and home) of the remote UE may be a network other than the 5GC (serving and home) of the relay UE. In FIGS. 2 and 3, the HPLMN (home network) and the serving PLMN (visited network) of the remote UE and of the relay UE are not split and certain embodiments may apply in contexts where this split is present. While certain embodiments described herein may addresses security of the architecture of FIG. 2 and FIG. 3, certain embodiments can apply to any L3 solution to support UE-to-network relay (including the baseline L3 UE to network relay solution already described in certain technical specifications). A user plane function (UPF) (for a relay UE) may represent the protocol data unit (PDU) session anchor (PSA) of the relay UE and the UPF (for a remote UE) may represent the PSA of the remote UE.

With respect to FIG. 3 specifically, in an Internet protocol version 4 (IPv4) case, the relay UE may allocate an IPv4 address to the remote UE and the relay UE may enforce network address and port translation (NAPT) between IP based traffic TCP or UDP/IP on PC5 and Uu interfaces. For downlink (DL) traffic, the relay UE may use the port above IP to determine the IP addressing information and the PC5 link to use to reach the remote UE. The relay UE may be unaware of whether it relays UP or CP for the remote UE. Still, with respect to FIG. 3, in an IPv6 case, the relay UE may request a prefix shorter than 64 bits and may allocate 64-bit IPv6 prefixes to the remote UEs from the prefix range received from the network.

As described above, FIGS. 2 and 3 are provided as examples. Other examples are possible, according to some embodiments.

Figure 4:
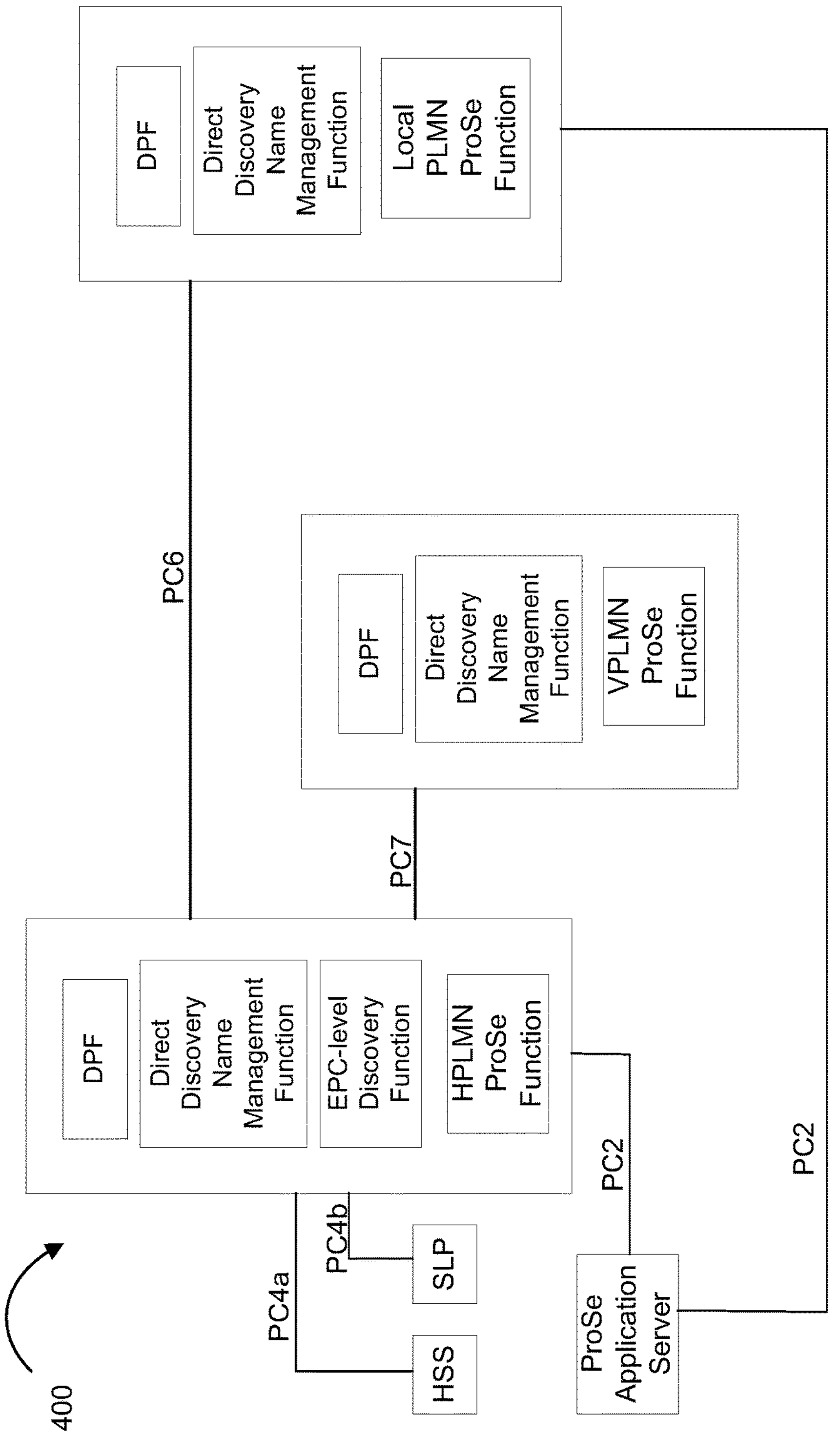
FIG. 4 illustrates an example of ProSe function interfaces to other network elements and public land mobile networks (PLMNs), according to some embodiments.

FIG. 4 illustrates an example of ProSe function interfaces to other network elements and public land mobile networks (PLMNs), according to some embodiments. For example, FIG. 4 illustrates an architecture 400 that includes various interfaces (e.g., PC2 interfaces, a PC4a interface, a PC4b interface, a PC6 interface, and a PC7 interface). The architecture 400 for ProSe may have been specified for 4G/long-term evolution (LTE) in certain technical specifications and security procedures may have been specified in certain other technical specifications. This architecture may define a L3 relay and may define a ProSe function in the network. The ProSe-enabled UE and the ProSe function may mutually authenticate each other. Authentication of the remote UE and boot strapping of a key for the ProSe function may be done using generic bootstrapping architecture (GBA) elements specified in certain technical specifications. The bootstrapping may be done using the bootstrapping server (BSF) in the GBA framework.

The ProSe function may include three main sub-functions that may perform different roles depending on the ProSe feature. For example, the sub-functions may include a direct provisioning function (DPF), which may be used to provision the UE with necessary parameters in order to use ProSe direct discovery and ProSe direct communication. As another example, the sub-functions may include a direct discovery name management function, which may be used for open ProSe direct discovery to allocate and process the mapping of ProSe application identifiers (IDs) and ProSe application codes used in ProSe direct discovery. An evolved packet core (EPC)-level discovery ProSe Function may have a reference point towards the AS (PC2 interface), towards other ProSe functions (PC6 interface), towards the home subscriber server (HSS) (PC4a interface) and the UE (PC3 interface). In prior solutions, UE authentication was performed over the PC4a interface.

As described above, FIG. 4 is provided as an example. Other examples are possible, according to some embodiments.

Some embodiments described herein may provide for creation of a PC5 connection between the remote UE and the relay UE (examples of the PC5 interface are illustrated in FIGS. 1 and 2). The remote UE may provide a request for relaying together with its own identifier (e.g., a subscription concealed identifier (SUCI)) to the relay UE and the relay UE may forward this identifier to the network so that the network can authenticate the remote UE. The network may check the authorization of using the relay UE and/or for relaying the remote UE (e.g., both the remote UE and the relay UE may be checked for a configuration that permits the relaying). For the authentication and authorization, the access and mobility management function (AMF) associated with the relay UE may forward the messages between the remote UE and the authentication server function (AUSF) of the remote UE. In this way, certain embodiments described herein may address certain security issues related to relaying a remote UE.

Figure 5:
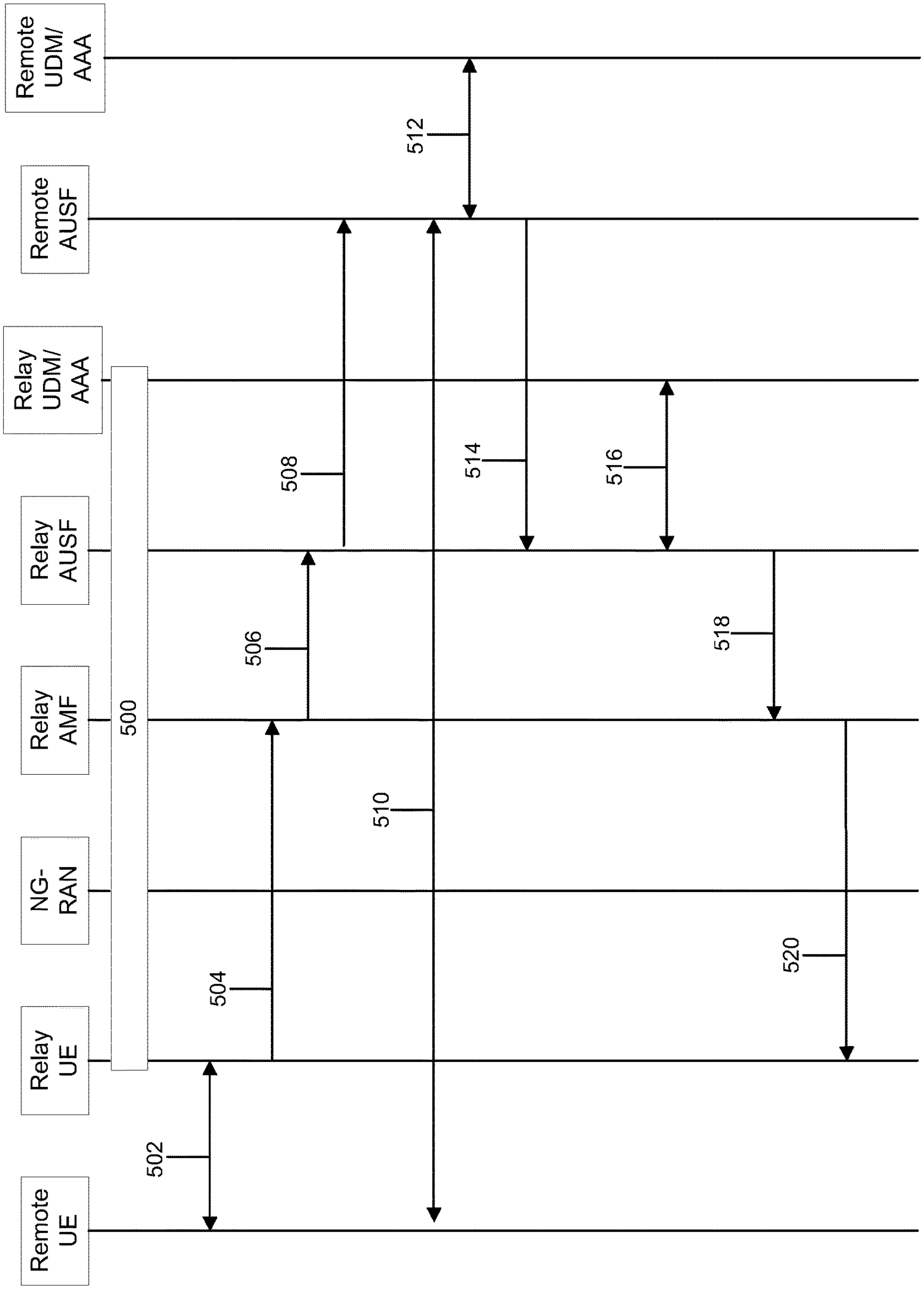
FIG. 5 illustrates an example signal diagram of authentication and authorization for UE-to-network relaying, according to some embodiments.

FIG. 5 illustrates an example signal diagram of authentication and authorization for UE-to-network relaying, according to some embodiments. For example, FIG. 5 illustrates a remote UE, a relay UE, a NG-RAN, a relay AMF (e.g., an AMF serving the relay UE), a relay AUSF (e.g., an AUSF that can serve the relay UE), a relay unified data management (UDM) (e.g., an UDM accessing subscription information of the relay UE)/an authentication, authorization, and accounting server (AAA) (e.g., an AAA controlling the service of the relay UE), a remote AUSF (e.g., an AUSF that can serve the remote UE), and a remote UDM/AAA. The relay AMF, the relay AUSF, and the relay UDM/AAA may be associated with the relay UE (e.g., associated with the same serving network as the relay UE), and the remote AUSF and the remote UDM/AAA may be associated with the remote UE (e.g., associated with the same serving network as the remote UE). A remote UE may be associated with a different serving network (e.g., a different serving PLMN) than the relay UE. For example, the remote UE may be associated with a first visited PLMN (VPLMN) and the relay UE may be associated with a second VPLMN.

As illustrated at 500, the relay UE may perform a registration procedure for the relay UE. At this operation one or more AMFs may have been allocated to the relay UE in the serving network of the relay UE. Likewise, one or more AUSFs may have been determined in the home network of the relay UE. As illustrated at 502, the remote UE and the relay UE may perform procedures for PC5 establishment. For example, the remote UE may provide a request to the relay UE for relaying the remote UE. The remote UE may provide an identifier for the remote UE (e.g., a SUCI) to the relay UE. The procedure at 502 may be associated with establishing a PC5 connection to the relay UE.

As illustrated at 504, the relay UE may provide, to the relay AMF, a request for authorization to relay the remote UE. The request may include a non-access stratum (NAS) message. The request may include the identifier for the remote UE (e.g., the SUCI).

In this way, the relay UE may contact its AMF and may request an authorization for relaying a remote UE by providing the SUCI of the remote UE, and certain embodiments may include defining NAS signaling supporting a request for authorization of relaying a remote UE (e.g., based on the SUCI of the remote UE). In certain embodiments, NAS messages may be exchanged between the relay UE and its serving network.

As illustrated at 506, the AMF relay may provide the request for authorization of relaying the remote UE to the relay AUSF. The request may include the identifier (e.g., SUCI) of the remote UE and/or an identifier for the relay UE (e.g., a subscription permanent identifier (SUPI) or a generic public subscription identifier (GPSI)). In this way, the AMF may send a request for authorization of relaying a remote UE to an AUSF in the HPLMN of the relay UE by providing the SUPI and GPSI of the relay UE and the SUCI of the remote UE. This may include defining a new NAUSF service related to providing authorization for relaying a remote UE (e.g., utilizing a SUCI of the remote UE, and/or a SUPI and GPSI of the relay UE).

As illustrated at 508, the relay AUSF may provide a request for authorization for a remote UE to be relayed by the relay UE. The request may include an identifier (e.g., SUCI) of the remote UE and/or an identifier for the relay UE (e.g., GPSI). In this way, the AUSF of the relay UE may forward the request to an AUSF of the HPLMN of the remote UE (determined based on the home network identifier and/or routing identifier of the SUCI of the remote UE). This may include defining a new NAUSF service where authorization is provided for a remote UE being relayed (e.g., based on a SUCI of the remote UE and/or a GPSI of the Relay UE). The operations illustrated at 508 may apply when the AUSF of the relay UE cannot handle authentication and authorization for the remote UE (e.g., when the home PLMN of the relay UE and of the remote UE are different). The relay AUSF may use the mobile country code (MCC)/mobile network code (MNC) of remote UE's SUCI and MCC/MNC of relay UE's SUPI to determine whether both the relay UE and the remote UE are from the same home network (HPLMN). When the AUSF of the relay UE can handle authentication and authorization for the remote UE, the AUSF of the relay UE may support its interactions at 510 and at 512

As illustrated at 510, the remote AUSF may perform authentication of the remote UE. This may include multiple exchanges between the AUSF of the remote UE and the remote UE. For example, the exchanges related with such authentication procedure may be relayed by the AUSF and the AMF of the relay UE and through the relay UE. These exchanges may be identified in such a way for the relay UE to know that the authentication procedure does not target itself, the relay UE, but targets the remote UE. This authentication flow may have to go via the AUSF of the relay UE as the AMF of the relay UE may reject requests coming from the AUSF of the remote UE (e.g., in cases where there is no business agreement between the serving network of the relay UE and the home network of the remote UE). In this way, the AUSF of the remote UE may authenticate the remote UE. The authentication may be run transparently through the AUSF and the AMF of the relay UE and through the relay UE: the AUSF and the AMF of the relay UE and the relay UE transparently relays the authentication related signaling without understanding (e.g., processing, evaluating, and/or the like) the authentication-related messages that are relayed. Some of these messages or some part of the messages may be encrypted (or partially encrypted) and can only be decrypted by the remote UE and the remote AUSF. This may include new NAS signaling between the relay UE and AMF of the relay UE. At the end of the authentication procedure, the AUSF may have determined the SUPI and GPSI of the remote UE. Both the remote UE and its AUSF may determine security (e.g., ciphering) material from the authentication of the remote UE. The security material (e.g., ciphering) may be used for PC5 security.

As illustrated at 512, the remote AUSF and the remote UDM/AAA may communicate to check whether the relaying is authorized or permitted by a configuration associated with the remote UE. For example, this check may be performed using the GPSI of the relay UE and/or the GPSI of the remote UE, or using one or more other identifiers associated with the relay UE and/or the remote UE. As one example alternative, the AUSF may request that the UDM check subscription data for the remote UE about whether the remote UE (identified by its SUPI) accepts the relay UE (identified by its GPSI) for relaying. As another example alternative, the HPLMN may have policies to check, from a third party AAA server (identified by the domain part of the GPSI of the remote UE), whether the remote UE (identified by its GPSI) accepts to be relayed by a relay UE identified by its GPSI.

As illustrated at 514, the remote AUSF may provide, to the relay AUSF, a response for authorization for a remote UE being relayed. The response may identify a result of the request (e.g., whether the request has been accepted or denied), an identity of the remote user equipment (UE), security material to be used in association with the relaying (e.g., a cipher, a public key-private key pair, a hash, etc.), and/or the like. The response may be included in a NAUSF message. In this way, assuming the check at 512 is positive, the AUSF of the remote UE may answer the request to provide authorization for a remote UE to be relayed from the AUSF of the HPLMN of the relay UE. The remote AUSF may provide a result and may provide security material derived above from the authentication of the remote UE.

As illustrated at 516, the relay AUSF and the relay UDM/AAA may communicate to check whether the relaying is authorized or permitted by a configuration associated with the remote UE. For example, this check may be performed using the GPSI of the relay UE and/or the GPSI of the remote UE, or using one or more other identifiers associated with the relay UE and/or the remote UE. In this way, the AUSF of the relay UE may check whether the relaying is authorized from the relay UE side. This may take one or more of various alternatives. One alternative may include the AUSF requesting that the UDM check subscription data for the relay UE about whether the relay UE (identified by its SUPI) accepts the remote UE (identified by its GPSI). As another alternative, the HPLMN may have policies to check from a third party AAA server (identified by the domain part of the GPSI of the relay UE) whether the relay UE (identified by its GPSI) accepts to relay the remote UE identified by its GPSI. This check may be performed in association with the relay AUSF providing the request to the remote AUSF, as described above.

As illustrated at 518, the relay AUSF may provide the response for authorization of relaying a remote UE to the relay AMF. The response may identify a result of the request, an identity of the remote user equipment (UE), security material to be used in association with the relaying, and/or the like. The response may be included in a NAUSF service operation. Assuming that the check in the previous operation is positive, the AUSF of the relay UE may answer the request to provide authorization for a remote UE to be relayed from the AMF of the Relay UE. The relay AUSF may provide a result and security material received above.

As illustrated at 520, the relay AMF may provide the response for authorization of relaying a remote UE to the relay UE. The response may identify a result of the request (e.g., whether the request has been accepted or denied), security material to be used in association with the relaying, and/or the like. The response may be included in a NAS message. In this way, the AMF (of the relay UE) may send a NAS response for authorization of relaying a remote UE (e.g., that includes a result of the request and/or security material).

Assuming the result of the request indicates that relaying by the relay UE is permitted, after receiving the response, the relay UE may perform relaying for the remote UE. For example, the remote UE may provide, and the relay UE may receive, data and the relay UE may provide the data to the relay AMF and/or the relay AUSF. If the answer is negative, the relay UE may trigger release of a PC5 connection or may maintain it, but without activating its UE-to-network relaying functionality.

The above described embodiments can be understood through various example use cases. Although certain embodiments are described herein in the context of the relay UE and the remote UE being from different home networks, one example case includes the relay UE and the remote UE having a subscription to the same HPLMN. In this case, the relay UE may register with a 5GS and may obtain service for itself. The remote UE may try to establish a PC5 connection to the relay UE. During the PC5 establishment, the remote UE may provide its SUCI to the relay UE when it requests UE-to-network relaying from the relay UE in a PC5 message. The relay UE may contact its AMF and may request (via a NAS message) an authorization for relaying a remote UE providing the SUCI of the remote UE. The NAS message may include a registration request where a new registration type is used to reflect that the request is for authentication of relaying a remote UE. Additionally, or alternatively, the NAS message may include an uplink NAS transport message where a new request type is used to reflect that the request is for authentication of relaying a remote UE. Additionally, or alternatively, the NAS message may include a new NAS message that may use a request type to reflect that the request is for authentication of relaying the remote UE.

The AMF may be aware of the AUSF as it was already selected during the initial registration of the relay UE. The AMF may send a request to the AUSF for authorization for acting as relay for the remote UE between the remote UE and the AUSF. The request may provide the SUPI (and/or a GPSI, or other identifier) of the Relay UE and the SUCI of the remote UE. The AUSF may use the MCC/MNC of the remote UE's SUCI and the MCC/MNC of the relay UE's SUPI to determine whether both the relay UE and remote UE are from the same home network (e.g., HPLMN).

The remote AUSF may authenticate the remote UE via the relay AMF and the relay UE. The AUSF may use the SUCI of the remote UE to obtain credentials for the authentication. The relay AUSF may check whether it is allowed for the relay UE to perform relaying for the remote UE. For this purpose, it may use the UDM and/or an external AAA server. For example, relaying may be allowed when both the remote UE and the relay UE are members of the same international mobile subscriber identity (IMSI)-group. The AUSF may provide the result of the authentication and authorization to the relay AMF. If the answer (e.g., the result of the request) is negative, the relay UE may trigger release of the PC5 connection or may maintain it, but without activating its UE-to-network relaying functionality.

Various deployment scenarios may be supported by certain embodiments. The remote UE and the relay UE may correspond to a different HPLMN. The relay 5GC (5GC for the relay UE) and the remote 5GC (5GC for the remote UE) may be the same or different 5GC networks. Certain network entities may check whether it is accepted for the remote UE to be relayed by the relay UE. This may use UDM subscription data for the remote UE, which may contain information on which relay UEs (e.g., any UE, a UE based on members of an IMSI group, and/or a UE based on a list of SUPI or GPSI) the remote UE accepts as the relay UE. In certain embodiments, relaying may be allowed when both the remote UE and the relay UE are members of the same IMSI-group. Additionally, or alternatively, other embodiments may use HPLMN policies that can be fetched from a third party server, where the policies indicate whether the remote UE accepts being relayed by a relay UE identified by its generic public subscription identifier (GPSI). During this step, the HPLMN may control whether relaying via the serving PLMN of the relay UE is allowed.

Certain embodiments may check whether it is accepted for the relay UE to be a relay for the remote UE. This may use UDM subscription data for the relay UE, which may contain information on which remote UEs (e.g., any UE, a UE based on members of an IMSI group, and/or a UE based on a list of SUPI or GPSI) the relay UE accepts for relaying. Additionally, or alternatively, this may use HPLMN policies that can be fetched from a third party server, where the policies indicate whether the relay UE accepts relaying a remote UE identified by its GPSI. The relay UE may be served by a VPLMN.

Certain embodiments may include usage of remote UE authentication by the remote AUSF to establish PC5 security material. As part of the authentication of the remote UE by a remote AUSF of the remote UEs HPLMN, PC5 related security material may be derived by both the remote AUSF and the remote UE. This derived security material may be provided back from the AUSF of the remote UE to the relay UE (via the AMF of the relay UE) together with the authorization for relaying.

As described above, FIG. 5 is provided as an example. Other examples are possible, according to some embodiments.

Certain embodiments may not spread the role of ProSe function (in EPC) into the AMF and the AUSF. Rather, the AMF may act as a relay as it does in network slicing specific authentication and authorization (NSSAA). The AUSF may be the entity able to contact the UDM and/or third party AAA server to check for UE-to-network relay-specific authentication and authorization (e.g., it contacts a third party AAA server as part of NSSAA). In this way, certain embodiments may be an extension of AMF/AUSF functions. In addition, utilizing AMF/NAS and AMF may eliminate having to define a secure communication channel to reach the entity delivering the UE-to-network relay-specific authentication and authorization, such as when GBA is not defined for 5GS.

Figure 6:
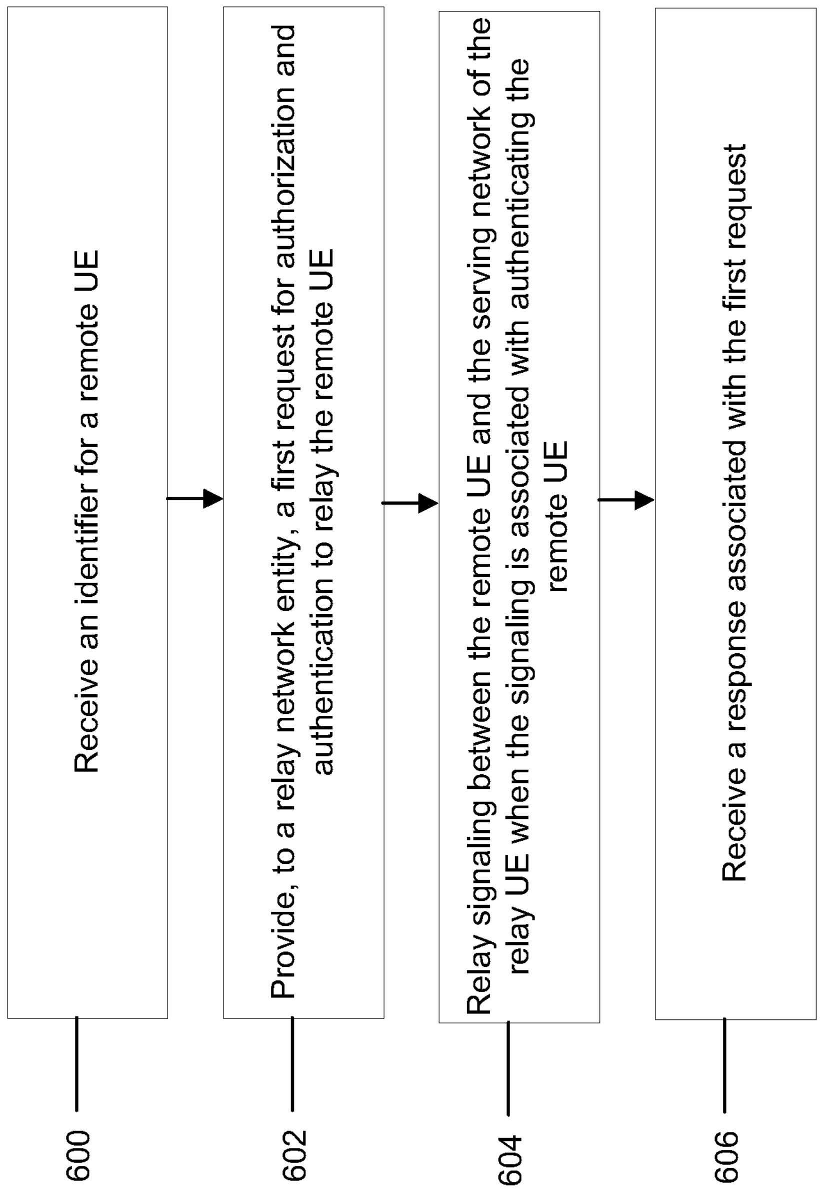
FIG. 6 illustrates an example flow diagram of a method, according to some embodiments.

FIG. 6 illustrates an example flow diagram of a method, according to some embodiments. For example, FIG. 6 shows example operations of a relay UE (e.g., apparatus 20). Some of the operations illustrated in FIG. 6 may be similar to some operations shown in, and described with respect to, FIGS. 1-5.

In an embodiment, the method may include, at 600, receiving an identifier for a remote UE. The relay UE may be within radio coverage of a network and may provide access to the network to the remote UE that is out of the radio coverage. In an embodiment, the method may include, at 602, providing, to a relay network entity, a first request for authorization and authentication to relay the remote UE. The first request may include the identifier for the remote UE. The relay network entity may be associated with a serving network of the relay UE. In an embodiment, the method may include, at 604, relaying signaling between the remote UE and the serving network of the relay UE when the signaling is associated with authenticating the remote UE. In an embodiment, the method may include, at 606, receiving a response associated with the first request. The response may include information identifying a result of the first request, or security information to be used in association with relaying the remote UE.

In some embodiments, the identifier of the remote UE may include a SUCI. In some embodiments, the relay network entity may include an AMF. In some embodiments, a NAS message may include the first request for authorization and authentication or the response associated with the first request. In some embodiments, the result of the first request may indicate that the first request has been accepted. In some embodiments, the method may further include relaying, to the relay network entity, data received via the connection based on the first request being accepted.

As described above, FIG. 6 is provided as an example. Other examples are possible according to some embodiments.

Figure 7:
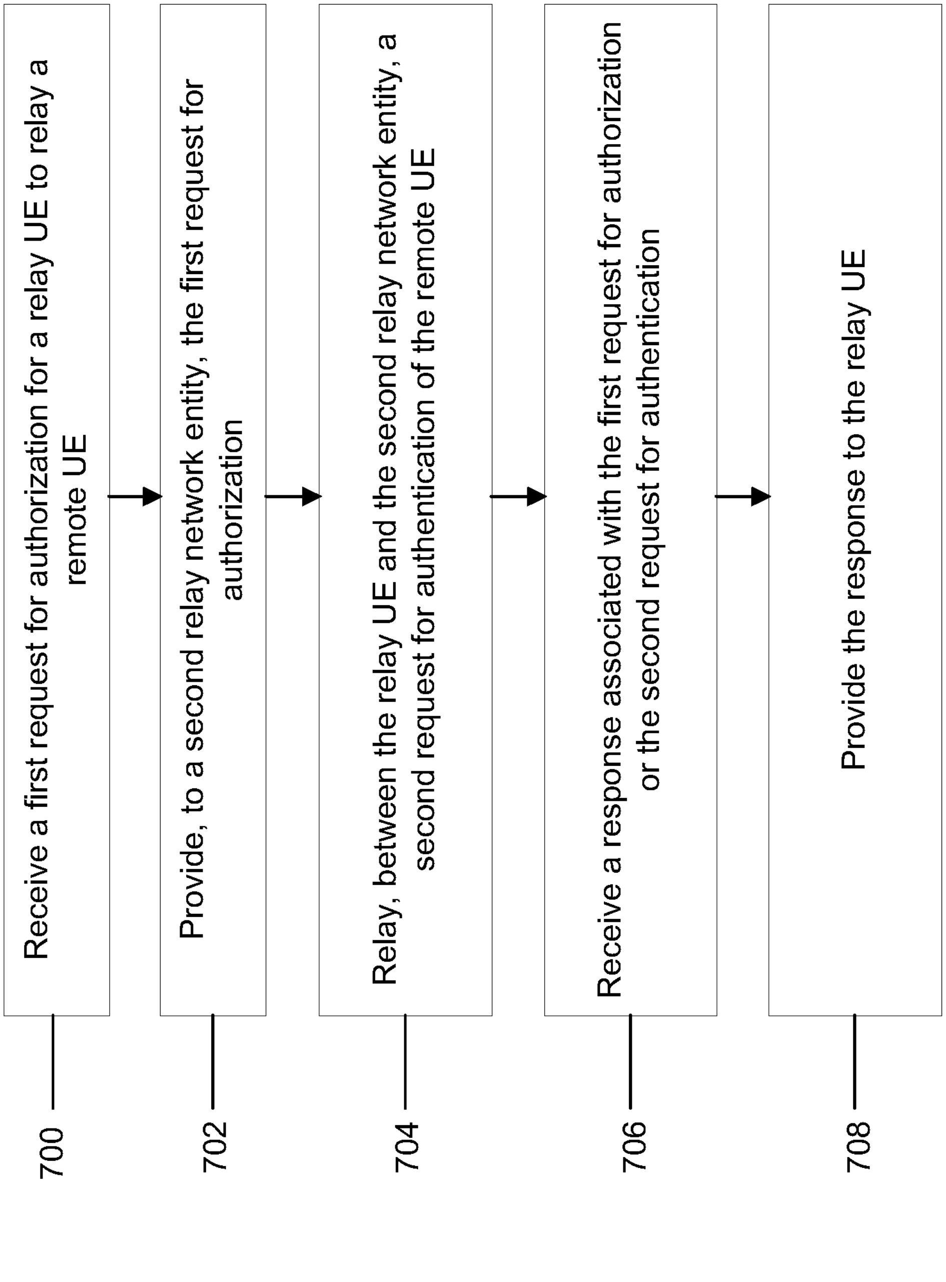
FIG. 7 illustrates an example flow diagram of a method, according to some embodiments.

FIG. 7 illustrates an example flow diagram of a method, according to some embodiments. For example, FIG. 7 shows example operations of relay AMF (a first relay network entity) (e.g., a network node (e.g., apparatus 10) that hosts a relay AMF). Some of the operations illustrated in FIG. 7 may be similar to some operations shown in, and described with respect to, FIGS. 1-5.

In an embodiment, the method may include, at 700, receiving a first request for authorization for a relay UE to relay a remote UE. The first request may include an identifier for the remote UE. The relay UE may be within radio coverage of a network and may provide access to the network to the remote UE that is out of the radio coverage. In an embodiment, the method may include, at 702, providing, to a second relay network entity, the first request for authorization. The first request may include an identifier for the remote UE and an identifier for the relay UE. The second relay network entity may be associated with a home network of the relay UE. In an embodiment, the method may include, at 704, relaying, between the relay UE and the second relay network entity, a second request for authentication of the remote UE. In an embodiment, the method may include, at 706, receiving a response associated with the first request for authorization or the second request for authentication. The response may include information identifying a result of the first request or the second request, or security information associated with the relay of the remote UE. In an embodiment, the method may include, at 708, providing the response to the relay UE.

In some embodiments, the identifier of the remote UE may include a SUCI. In some embodiments, the identifier of the relay UE may include at least one of a SUPI or a GPSI. In some embodiments, the first relay network entity may include an AMF. In some embodiments, the second relay network entity may include an AUSF. In some embodiments, the result of the first request may indicate that the first request has been denied. In some embodiments, the result of the first request may indicate that the first request has been accepted.

As described above, FIG. 7 is provided as an example. Other examples are possible according to some embodiments.

Figure 8:
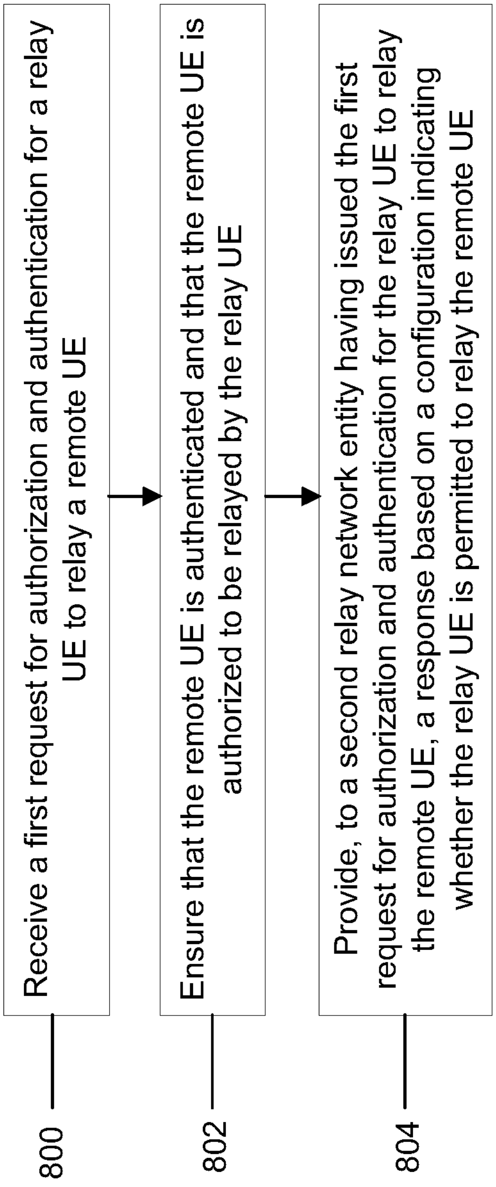
FIG. 8 illustrates an example flow diagram of a method, according to some embodiments.

FIG. 8 illustrates an example flow diagram of a method, according to some embodiments. For example, FIG. 8 shows example operations of a relay AUSF (a first relay network entity) (e.g., a network entity (e.g., apparatus 10) that hosts a relay AUSF). Some of the operations illustrated in FIG. 8 may be similar to some operations shown in, and described with respect to, FIGS. 1-5.

In an embodiment, the method may include, at 800, receiving a first request for authorization and authentication for a relay UE to relay a remote UE. The first request may include an identifier for the remote UE and an identifier for the relay UE. In an embodiment, the method may include, at 802, ensuring that the remote UE is authenticated and that the remote UE is authorized to be relayed by the relay UE (e.g., by either performing the authentication itself or requesting another network entity (of the remote UE to authenticate)). In an embodiment, the method may include, at 804, providing, to a second relay network entity having issued the first request for authorization and authentication for the relay UE to relay the remote UE, a response based on a configuration indicating whether the relay UE is permitted to relay the remote UE.

In some embodiments, determining that the remote UE is authenticated and that the remote UE is authorized, may include, when the remote UE and the relay UE have different home networks or when the remote UE cannot be served by the first relay network entity (e.g., another AUSF may have to be used even though both the relay UE and the remote UE have the same HPLMN), providing, to a remote network entity, a second request for authorization for the remote UE to be relayed by the relay UE. In some embodiments, the remote network entity may be associated with a home network associated with the remote UE. In some embodiments, determining that the remote UE is authenticated and that the remote UE is authorized, may include, when the remote UE and the relay UE have different home networks or when the remote UE cannot be served by the first relay network entity, relaying, between the first relay network entity and the remote network entity, a third request associated with authenticating the remote UE. In some embodiments, determining that the remote UE is authenticated and that the remote UE is authorized, may include, when the remote UE and the relay UE have different home networks or when the remote UE cannot be served by the first relay network entity, receiving a response associated with the second request or the third request. In some embodiments, the response may include information identifying a result of the second request or the third request, an identity of the remote UE, or security information associated with the relay of the remote UE.

In some embodiments, the identifier of the remote UE may include a SUCI. In some embodiments, the identifier of the relay UE may include at least one of a SUPI or a GPSI. In some embodiments, the first relay network entity may include an AUSF. In some embodiments, the second relay network entity may include an AMF. In some embodiments, the first request may be received from the second network entity. In some embodiments, the remote network entity may include an AUSF.

In some embodiments, the result of the first request may indicate that the first request has been denied. In some embodiments, the result of the first request may indicate that the first request has been accepted. In some embodiments, the method may include determining whether the configuration indicates that the relay UE is permitted to relay the remote UE based on information from an UDM function or from an AAA server.

In some embodiments, determining that the remote UE is authenticated and that the remote UE is authorized, may include, when the remote UE and the relay UE have a same home network, authenticating the remote UE via a relay serving network entity. In some embodiments, determining that the remote UE is authenticated and that the remote UE is authorized, may include, when the remote UE and the relay UE have a same home network, determining whether the configuration indicates that the remote UE is permitted to be relayed by the relay UE. In some embodiments, determining that the remote UE is authenticated and that the remote UE is authorized, may include, when the remote UE and the relay UE have a same home network, exchanging, with the remote UE, signaling to perform authentication and authorization for the remote UE via a serving network of the relay UE and the relay UE. In some embodiments, an indication used by the serving network of the relay UE and by the relay UE may be associated with relaying the signaling.

As described above, FIG. 8 is provided as an example. Other examples are possible according to some embodiments.

Figure 9:
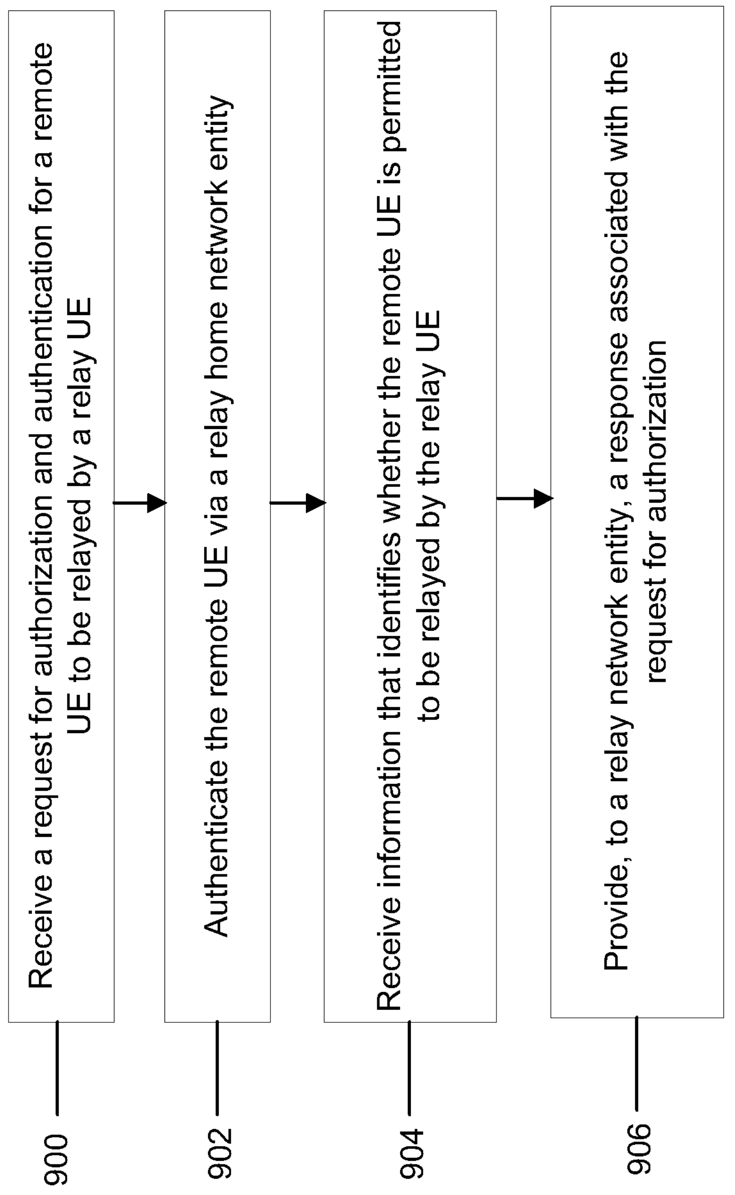
FIG. 9 illustrates an example flow diagram of a method, according to some embodiments.

FIG. 9 illustrates an example flow diagram of a method, according to some embodiments. For example, FIG. 9 shows example operations of a remote AUSF (a remote network entity) (e.g., a network node (e.g., apparatus 10) that hosts a remote AUSF). Some of the operations illustrated in FIG. 9 may be similar to some operations shown in, and described with respect to, FIGS. 1-5.

In an embodiment, the method may include, at 900, receiving a request for authorization and authentication for a remote UE to be relayed by a relay UE. The request may include an identifier for the remote UE and an identifier for the relay UE. The relay UE may be within radio coverage of a network and may provide access to the network to the remote UE that is out of the radio coverage. In an embodiment, the method may include, at 902, authenticating the remote UE via a relay home network entity (e.g., the AUSF of the remote UE may authenticate the remote UE exchanging signaling via the AUSF of the relay UE (itself using the AMF of the relay UE and then the relay UE to reach the remote UE)). In an embodiment, the method may include, at 904, receiving information that identifies whether the remote UE is permitted to be relayed by the relay UE (e.g., received from another remote network entity). In an embodiment, the method may include, at 906, providing, to a relay network entity, a response associated with the request for authorization. The response may include information identifying a result of the request, an identity of the remote UE, or security information associated with the relay of the remote UE.

In some embodiments the identifier of the remote UE may include a SUCI. In some embodiments, the identifier of the relay UE may include at least one of a SUPI or a GPSI. In some embodiments, the remote network entity may include an AUSF. In some embodiments, the relay network entity may include an AUSF.

In some embodiments, the result of the request may indicate that the request has been denied. In some embodiments, the result of the request may indicate that the request has been accepted. In some embodiments, the method may further include determining whether the remote UE is permitted to be relayed by the relay UE.

In some embodiments, the method may include providing the response based on determining that the remote UE is permitted to be relayed by the relay UE. In some embodiments, the method may include determining whether the remote UE is permitted to be relayed by the relay UE based on information from an UDM function or an AAA server. In some embodiments, the method may include authenticating the remote UE. In some embodiments, the method may include generating the security material based on a result of authenticating the remote UE.

As described above, FIG. 9 is provided as an example. Other examples are possible according to some embodiments.

Figures 10A, 10B:
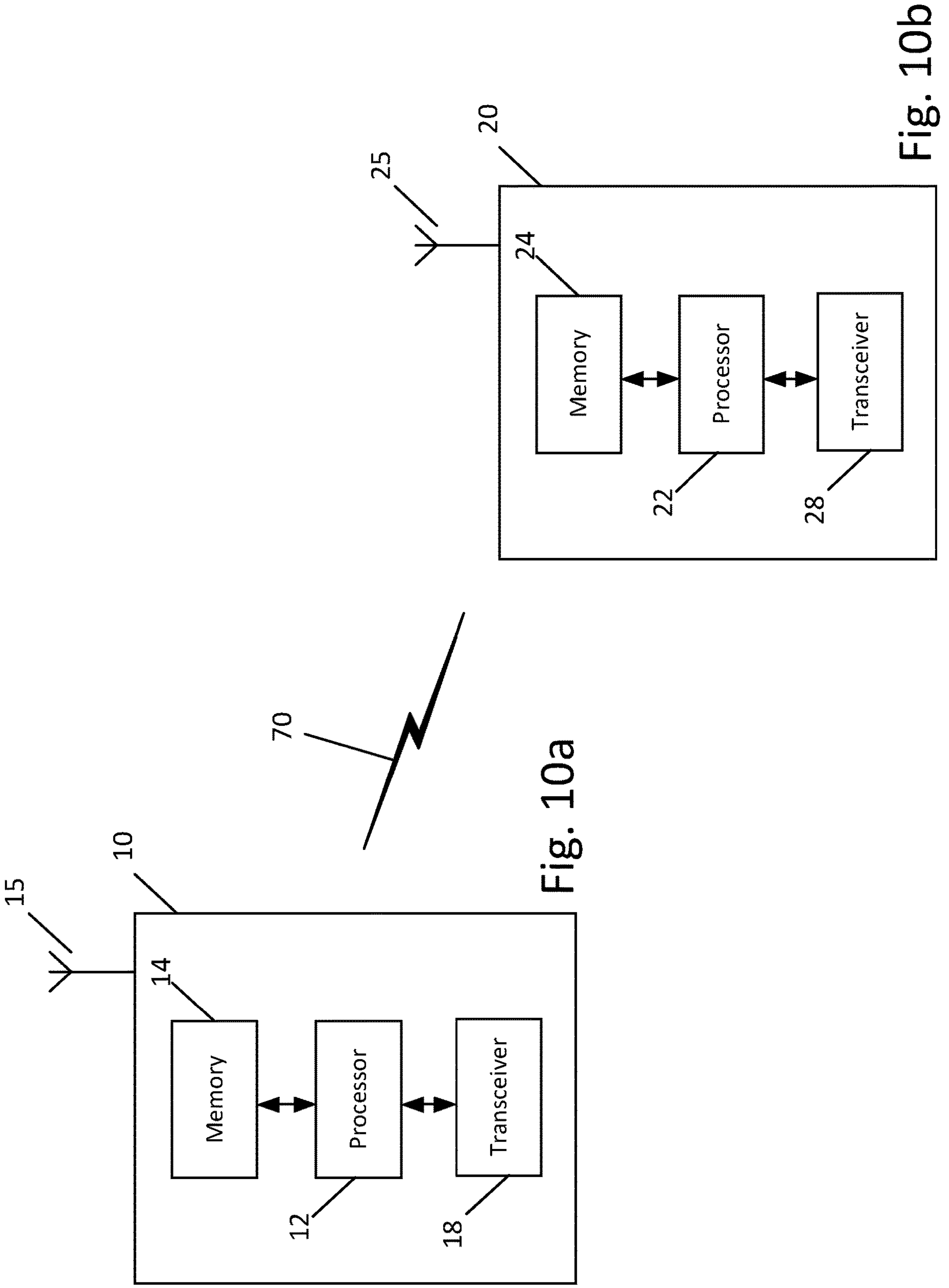
FIG. 10*a* illustrates an example block diagram of an apparatus, according to an embodiment.
FIG. 10*b* illustrates an example block diagram of an apparatus, according to another embodiment.

FIG. 10*a* illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In example embodiments, apparatus 10 may be an eNB in LTE or gNB in 5G. In some embodiments, a network node may host a network entity, such as an AMF, an AUSF, an AAA, an UDM, and/or the like described elsewhere herein.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 10*a*.

As illustrated in the example of FIG. 10*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 10*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIGS. 1-9.

For instance, in one embodiment, apparatus 10 may be controlled by memory 14 and processor 12 to receive a first request for authorization for a relay UE to relay a remote UE. The first request may include an identifier for the remote UE. The relay UE may be within radio coverage of a network and may provide access to the network to the remote UE that is out of the radio coverage. In one embodiment, apparatus 10 may be controlled by memory 14 and processor 12 to provide, to a second relay network entity, the first request for authorization. The first request may include an identifier for the remote UE and an identifier for the relay UE. The second relay network entity may be associated with a home network of the relay UE. In one embodiment, apparatus 10 may be controlled by memory 14 and processor 12 to relay, between the relay UE and the second relay network entity, a second request for authentication of the remote UE. In one embodiment, apparatus 10 may be controlled by memory 14 and processor 12 to receive a response associated with the first request for authorization or the second request for authentication. The response may include information identifying a result of the first request or the second request, or security information associated with the relay of the remote UE. In one embodiment, apparatus 10 may be controlled by memory 14 and processor 12 to provide the response to the relay UE.

In one embodiment, apparatus 10 may be controlled by memory 14 and processor 12 to receive a first request for authorization and authentication for a relay UE to relay a remote UE. The first request may include an identifier for the remote UE and an identifier for the relay UE. In one embodiment, apparatus 10 may be controlled by memory 14 and processor 12 to ensure that the remote UE is authenticated and that the remote UE is authorized to be relayed by the relay UE. In one embodiment, apparatus 10 may be controlled by memory 14 and processor 12 to provide, to a second relay network entity having issued the first request for authorization and authentication for the relay UE to relay the remote UE, a response based on a configuration indicating whether the relay UE is permitted to relay the remote UE.

In one embodiment, apparatus 10 may be controlled by memory 14 and processor 12 to receive a request for authorization and authentication for a remote UE to be relayed by a relay UE. The request may include an identifier for the remote UE and an identifier for the relay UE. The relay UE may be within radio coverage of a network and may provide access to the network to the remote UE that is out of the radio coverage. In one embodiment, apparatus 10 may be controlled by memory 14 and processor 12 to authenticate the remote UE via a relay home network entity. In one embodiment, apparatus 10 may be controlled by memory 14 and processor 12 to receive, from another remote network entity, information that identifies whether the remote UE is permitted to be relayed by the relay UE. In one embodiment, apparatus 10 may be controlled by memory 14 and processor 12 to provide, to a relay network entity, a response associated with the request for authorization. The response may include information identifying a result of the request, an identity of the remote UE, or security information associated with the relay of the remote UE.

FIG. 10*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 10*b*.

As illustrated in the example of FIG. 10*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 10*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-5.

For instance, in one embodiment, apparatus 20 may be controlled by memory 24 and processor 22 to receive an identifier for a remote UE. The relay UE may be within radio coverage of a network and may provide access to the network to the remote UE that is out of the radio coverage. In one embodiment, apparatus 20 may be controlled by memory 24 and processor 22 to provide, to a relay network entity, a first request for authorization and authentication to relay the remote UE. The first request may include the identifier for the remote UE. The relay network entity may be associated with a serving network of the relay UE. In one embodiment, apparatus 20 may be controlled by memory 24 and processor 22 to relay signaling between the remote UE and the serving network of the relay UE when the signaling is associated with authenticating the remote UE. In one embodiment, apparatus 20 may be controlled by memory 24 and processor 22 to receive a response associated with the first request. The response may include information identifying a result of the first request, or security information to be used in association with relaying the remote UE.

Therefore, certain example embodiments provide several technological improvements, enhancements, and/or advantages over existing technological processes. For example, one benefit of some example embodiments is enhanced security with respect to relay of a remote UE. Accordingly, the use of some example embodiments results in improved functioning of communications networks and their nodes and, therefore constitute an improvement at least to the technological field of remote UE relaying, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single UE equally applies to embodiments that include multiple instances of the UE, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

Partial Glossary

5GC 5G Core Network
5GS 5G System
5G-AN 5G Access Network
5G-GUTI 5G Globally Unique Temporary Identifier
5G-S-TMSI 5G S-Temporary Mobile Subscription Identifier
AMF Access and Mobility Management Function
AUSF Authentication Server Function
CHF Charging Function
CP Control Plane
DL Downlink
DN Data Network
DNN Data Network Name
GPSI Generic Public Subscription Identifier
HR Home Routed (roaming)

IMEI/TAC IMEI Type Allocation Code
LBO Local Break Out (roaming)
N3IWF Non-3GPP InterWorking Function
NEF Network Exposure Function
NF Network Function
NR New Radio
PEI Permanent Equipment Identifier
(R)AN/RAN (Radio) Access Network/Radio Access Network
SEAF Security Anchor Functionality
SMF Session Management Function
UDM Unified Data Management
UDR Unified Data Repository
UL Uplink
UPF User Plane Function

We claim:

1. A relay user equipment, comprising:

at least one processor; and at least one memory including computer program code, wherein the computer program code is configured to, when executed by the at least one processor, cause the relay user equipment at least to perform operations comprising:

receiving an identifier of a remote user equipment via a direct communication connection between the relay user equipment and the remote user equipment, wherein the remote user equipment is out of radio coverage of a radio network that provides access to a serving network of the remote user equipment;

providing, to a relay network entity of a serving network of the relay user equipment, a first non-access stratum message comprising a first request for authorization for the relay user equipment to be a relay for the remote user equipment, wherein the first request comprises the identifier for the remote user equipment;

relaying signaling associated with authenticating the remote user equipment with the serving network of the remote user equipment that is received from the remote user equipment to a serving network of the relay user equipment and relaying signaling associated with authenticating the remote user equipment with the serving network of the remote user equipment that is received from the serving network of the relay user equipment to the remote user equipment, wherein the signaling associated with authenticating the remote user equipment received from the remote user equipment is destined for a network entity of the serving network of the remote user equipment and the signaling associated with authenticating the remote user equipment received from the serving network of the relay user equipment originates at the network entity of the serving network of the remote user equipment and is destined for the remote user equipment, and wherein the serving network of the remote user equipment differs from the serving network of the relay user equipment; and receiving, from the relay network entity, a second non-access stratum message comprising a response to the first request, wherein the response to the first request comprises:

security information to be used in association with relaying, by the relay user equipment, control plane signaling and user plane traffic of the remote user equipment received via a direct connection, to the serving network of the remote user equipment via the serving network of the relay user equipment and/or relaying, by the relay user equipment, control plane signaling and user plane traffic for the remote user equipment received from the serving network of the remote user equipment via the serving network of the relay user equipment, to the remote user equipment via the direct connection.

2. The relay user equipment according to claim 1, wherein the identifier of the remote user equipment comprises a subscription concealed identifier.

3. The relay user equipment according to claim 1, wherein the relay network entity comprises an access and mobility management function.

4. The relay user equipment according to claim 1, wherein the response further comprises information indicating that the first request has been accepted, and wherein the method further comprises:

relaying, to the serving network of the relay user equipment, control plane signaling and user plane traffic received from the remote user equipment via the direct connection and relaying, to the remote user equipment, control plane signaling and user plane traffic received from the serving network of the remote user equipment via the serving network of the relay user equipment based on the information indicating that the first request has been accepted.

5. A method, comprising:

receiving, by a relay user equipment, an identifier of a remote user equipment via a direct communication connection between the relay user equipment and the remote user equipment, wherein the remote user equipment is out of radio coverage of a radio network that provides access to a serving network of the remote user equipment;

providing by the relay user equipment to a relay network entity of a serving network of the relay user equipment, a first non-access stratum message comprising a first request for authorization for the relay user equipment to be a relay for the remote user equipment, wherein the first request comprises the identifier for the remote user equipment;

relaying, by the relay user equipment, signaling associated with authenticating the remote user equipment with the serving network of the remote user equipment that is received from the remote user equipment to the serving network of the relay user equipment and relaying signaling associated with authenticating the remote user equipment with the serving network of the remote user equipment that is received from the serving network of the relay user equipment to the remote user equipment, wherein the signaling associated with authenticating the remote user equipment received from the remote user equipment is destined for a network entity of the serving network of the remote user equipment and the signaling associated with authenticating the remote user equipment received from the serving network of the relay user equipment originates at the network entity of the serving network of the remote user equipment and is destined for the remote user equipment, and wherein the serving network of the remote user equipment differs from the serving network of the relay user equipment; and receiving by the relay user equipment from the relay network entity, a second non-access stratum message comprising a response to the first request, wherein the response comprises:

security information to be used in association with relaying, by the relay user equipment, control plane signaling and user plane traffic of the remote user equipment received via a direct connection, to the serving network of the remote user equipment via the serving network of the relay user equipment and/or relaying, by the relay user equipment, control plane signaling and user plane traffic for the remote user equipment received from the serving network of the remote user equipment via the serving network of the relay user equipment, to the remote user equipment via the direct connection.

6. The method according to claim 5, wherein the identifier of the remote user equipment comprises a subscription concealed identifier.

7. The method according to claim 5, wherein the relay network entity comprises an access and mobility management function.

8. The method according to claim 5, wherein the response further comprises information indicating that the first request has been accepted, and wherein the method further comprises:

relaying, to the serving network of the relay user equipment, control plane signaling and user plane traffic received from the remote user equipment via the direct connection and relaying, to the remote user equipment, control plane signaling and user plane traffic received from the serving network of the remote user equipment via the serving network of the relay user equipment based on the information indicating that the first request has been accepted.

* * * * *